United States Patent
Cosgrove et al.

(10) Patent No.: US 8,752,457 B1
(45) Date of Patent: Jun. 17, 2014

(54) PALLET DISMANTLER

(75) Inventors: Andrew J. Cosgrove, Evansville, IN (US); Randall W. Wink, Evansville, IN (US); David L. Dippel, Evansville, IN (US)

(73) Assignee: Pellet Recyclers LLC, Evansville, IN (US)

( * ) Notice: Subject to any disclaimer, the term of this patent is extended or adjusted under 35 U.S.C. 154(b) by 1325 days.

(21) Appl. No.: 11/688,661

(22) Filed: Mar. 20, 2007

(51) Int. Cl.
*B26D 7/06* (2006.01)
*B26D 1/46* (2006.01)
*B27B 13/04* (2006.01)
*B23P 19/00* (2006.01)

(52) U.S. Cl.
USPC ........ 83/13; 83/809; 83/812; 83/425; 83/943; 29/426.5

(58) Field of Classification Search
USPC ........ 83/801, 809, 813, 468.3, 788, 812, 155, 83/425, 943, 444, 448, 438; 29/426.4, 29/772, 564.3, 426.1, 426.5, 791
See application file for complete search history.

(56) References Cited

U.S. PATENT DOCUMENTS

| | | | |
|---|---|---|---|
| 2,593,843 A * | 4/1952 | Cannon | 29/33 R |
| 3,512,242 A * | 5/1970 | Harvis | 29/252 |
| 3,846,890 A * | 11/1974 | Bielkiewicz | 29/239 |
| 3,869,780 A | 3/1975 | Ginnow et al. | |
| 4,111,085 A * | 9/1978 | Johnson | 83/871 |
| 4,152,819 A * | 5/1979 | Conkle | 29/252 |
| 4,241,495 A | 12/1980 | Wakeem | |
| 4,320,570 A * | 3/1982 | Williams | 29/564.3 |
| 4,492,016 A * | 1/1985 | Smets et al. | 29/432 |
| 4,757,599 A | 7/1988 | Bane | |
| 4,945,626 A | 8/1990 | Dykstra et al. | |
| 5,201,110 A | 4/1993 | Bane | |
| 5,243,751 A * | 9/1993 | Dykstra et al. | 29/564.3 |
| 5,414,924 A * | 5/1995 | Johnson et al. | 29/564.3 |
| 5,467,516 A * | 11/1995 | DeGeorge | 29/239 |
| 5,600,882 A * | 2/1997 | Beane | 29/822 |
| 6,128,992 A * | 10/2000 | Waechter et al. | 83/425.2 |
| 6,135,003 A * | 10/2000 | Mason | 83/788 |
| 6,154,955 A * | 12/2000 | Beane | 29/822 |
| 6,293,000 B1 | 9/2001 | Smets | |
| 6,687,970 B2 | 2/2004 | Waechter et al. | |
| 6,772,665 B1 * | 8/2004 | Hurdle, Jr. | 83/109 |
| 6,865,975 B2 * | 3/2005 | Waechter et al. | 83/425 |
| 7,117,586 B2 * | 10/2006 | Dykstra et al. | 29/772 |
| 2005/0022354 A1 | 2/2005 | Dykstra et al. | |

* cited by examiner

*Primary Examiner* — Ghassem Alie
*Assistant Examiner* — Bharat C Patel
(74) *Attorney, Agent, or Firm* — Camoriano & Associates (57) ABSTRACT

A pallet dismantler includes cantilevered supports to support a pallet by its deck boards, which automatically aligns the pallet with a band saw blade.

8 Claims, 13 Drawing Sheets

PALLET DISMANTLER

BACKGROUND

The present invention relates to saws and, in particular, to a saw for dismantling pallets. A pallet is a support structure typically constructed from wooden boards fastened together to form a framework that is useful for shipping and/or storing materials. Generally, the pallet includes upper and lower sets of deck boards, which are nailed or stapled to a set of stringer boards between the upper and lower sets of deck boards. The deck boards lie parallel to each other and usually are 40 inches long. The stringer boards lie parallel to each other and perpendicular to the deck boards and usually are 48 inches long. Once the pallets have been used, it often is desirable to dismantle them, separating the boards from each other so they can be handled easily. In prior art pallet dismantling, saws, there typically has been a problem getting the saw blade aligned with the pallet so it cuts exactly at the intersection of the deck boards with the stringer boards in order to cut through the fasteners, such as nails or staples, while leaving the boards intact.

DETAILED DESCRIPTION

FIGS. 1-7A show one embodiment of a pallet dismantler 10 made in accordance with the present invention. The basic components of the pallet dismantler 10 include a support frame 20 having an upstream end 22, a downstream end 24, left side 26, and right side 28. Elongated, parallel cantilevered supports 30 are supported at the downstream end 24 of the frame 20 and project to the upstream end 22. A band saw 35 is mounted between the upstream and downstream ends 22, 24 and has a saw blade 40 extending across the top of the cantilevered supports 30 from the left side 26 to the right side 28. The cantilevered supports 30 extend in a horizontal direction, and their top surfaces define a horizontal plane.

The band saw blade 40 rotates at a high speed. It extends tightly around tires mounted on left and right wheels 42, 44 (shown in FIGS. 1 and 3), which are driven by a motor 46 that engages the left wheel 42 (best shown in FIG. 5), as is commonly known in the art. In this case, the band saw blade 40 lies directly on top of the cantilevered supports 30 and thus defines a horizontal cutting plane that is parallel to and aligned with the horizontal plane defined by the top surfaces of the cantilevered supports 30. When the band saw 35 is turned on, the blade 40 rotates in a counterclockwise direction (as viewed from the upstream end of the pallet dismantler 10) so that the band saw blade 40 moves from right to left through the cutting plane as denoted by the arrow 48 in FIG. 3. The high-speed rotation of the band saw blade 40 is used to sever the fasteners of a pallet in order to separate the boards, as will be explained in greater detail later.

Figure 1:
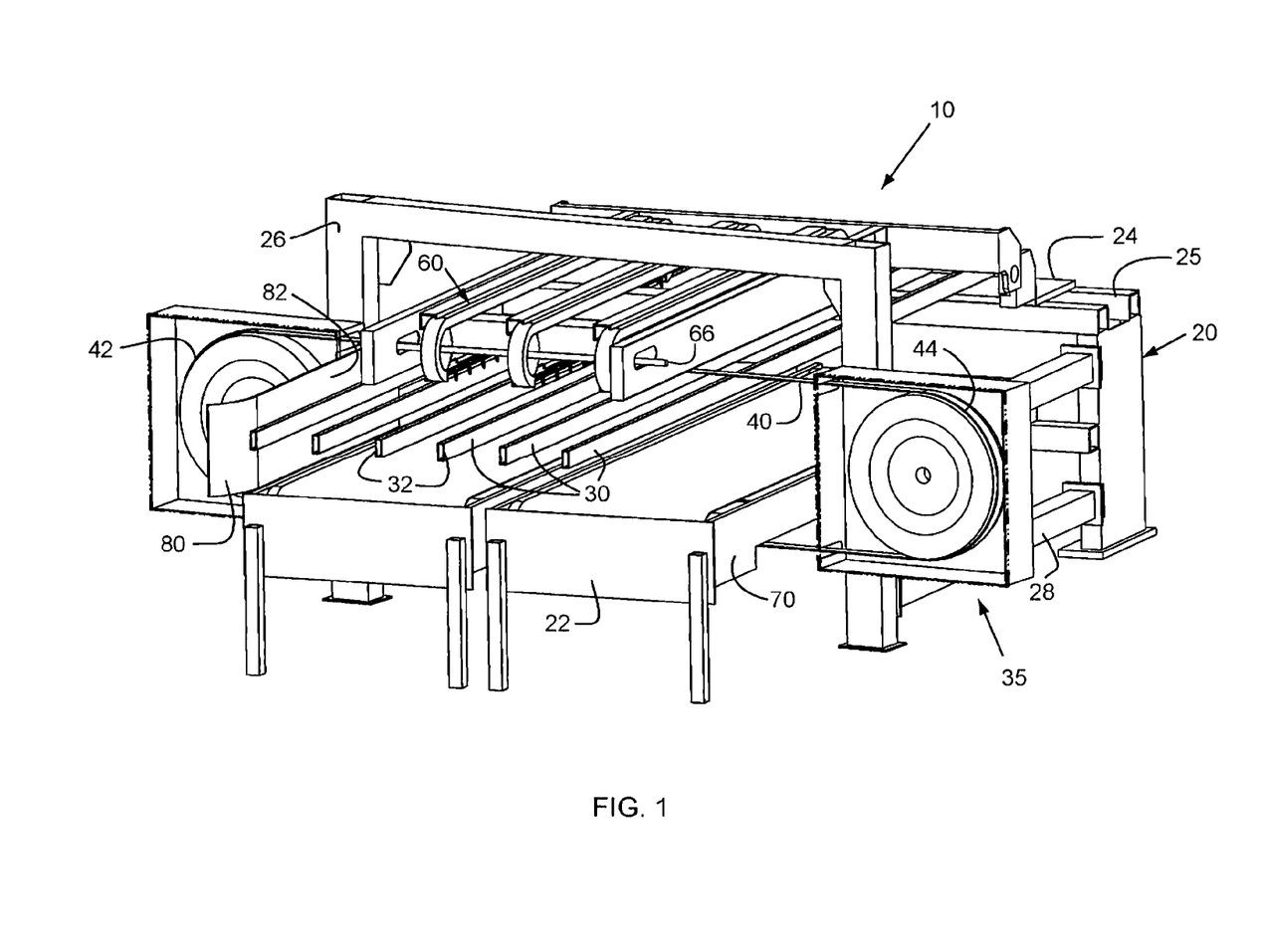
FIG. 1 is an upstream perspective view of one embodiment of a pallet dismantler made in accordance with the present invention.
Figure 1A:
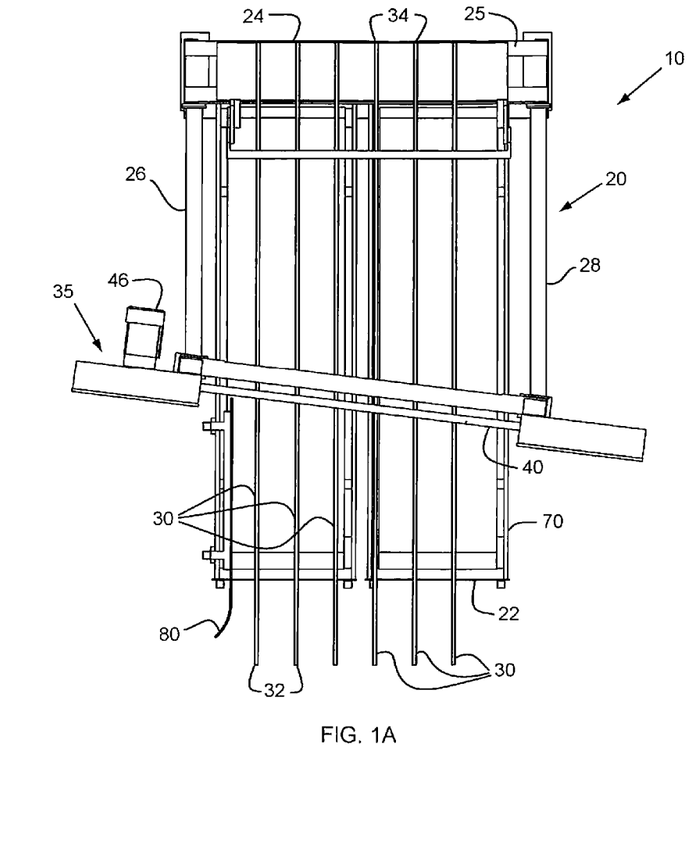
FIG. 1A is a top view of the pallet dismantler of FIG. 1, with the feed conveyor removed for clarity.
Figure 2:
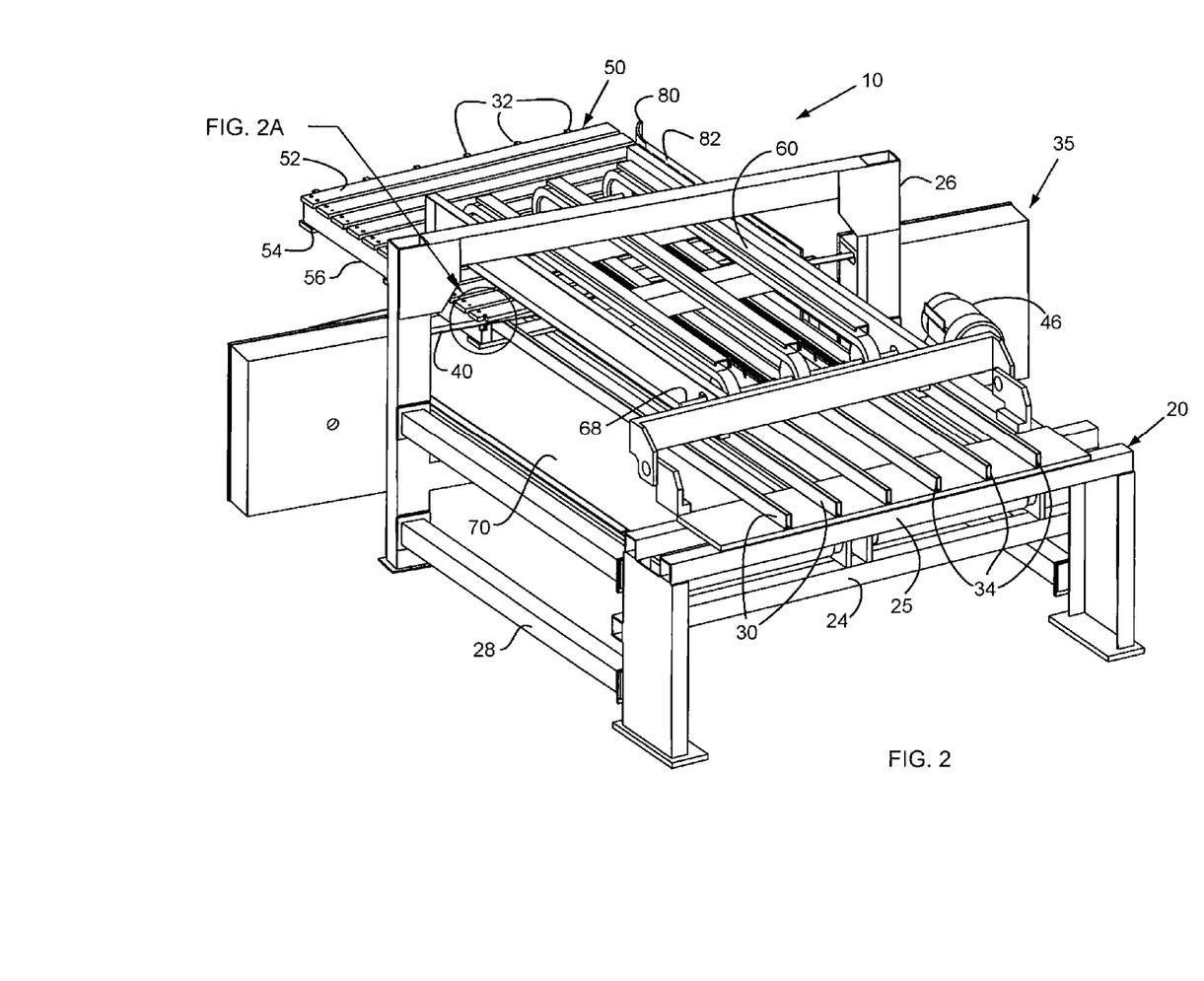
FIG. 2 is a downstream perspective view of the pallet dismantler of FIG. 1, shown with a pallet loaded.

As best shown in FIG. 1A, each cantilevered support 30 has a downstream end 34 near the downstream ends 24 of the frame 20 and extends past the band saw blade 40 to an upstream end 32 near the upstream end 22 of the frame 20. As shown in FIG. 2, the cantilevered supports 30 are mounted on a cross-beam 25 at the downstream end 24 of the frame 20 and then are unsupported or cantilevered as they project upstream from the cross-beam 25 to their free ends 32. Each cantilevered support has a top surface and a bottom surface opposite said top surface, with the top surface of the respective cantilevered support 30 lying at a higher elevation than the bottom surface of that cantilevered support 30.

Figure 5:
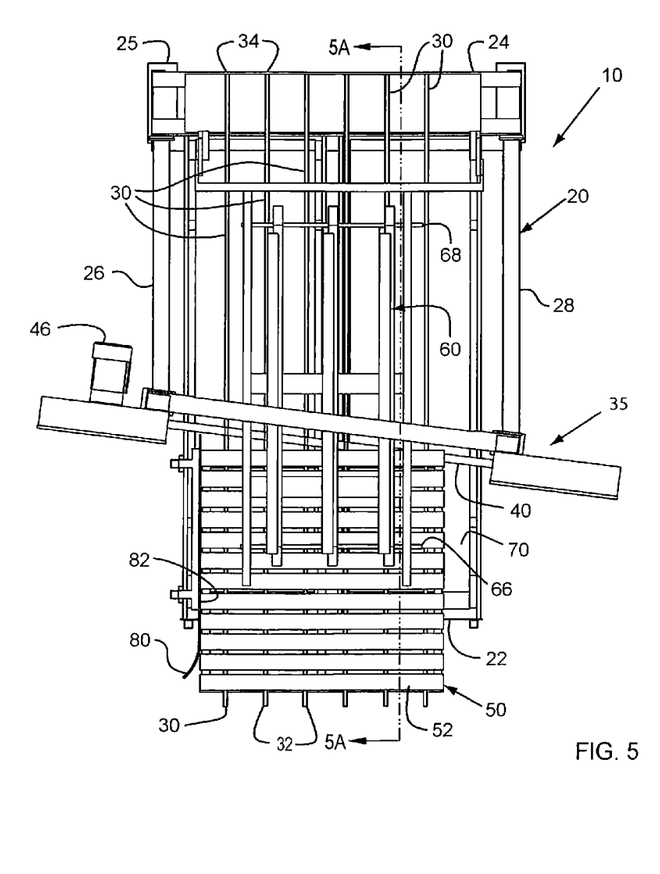
FIG. 5 is a top view of the pallet dismantler of FIG. 1, shown in a first stage of dismantling a pallet.
Figure 5A:
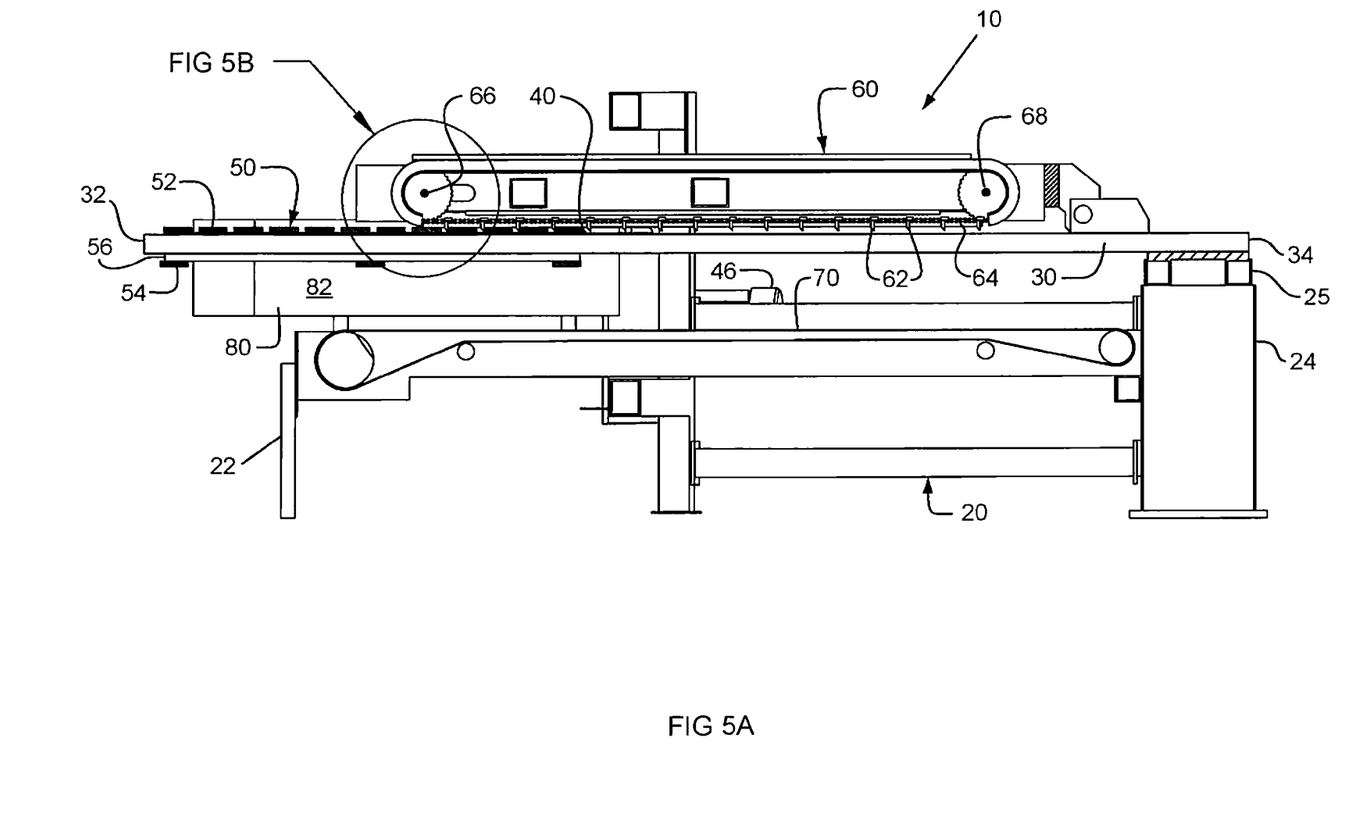
FIG. 5A is a side sectional view taken along line 5A-5A of FIG. 5.

In this embodiment, there are six cantilevered supports 30, and the upstream ends 32 of the cantilevered supports 30 are upstream of the band saw blade 40 a distance of 52 inches, which is slightly greater than the 48-inch length of a standard pallet 50 (the length of the stringer boards 56), as best shown in FIGS. 5 and 5A. While it is preferred for the cantilevered supports 30 to extend upstream of the band saw blade 40 the full length of the pallet stringers 56 in order to provide good support for the pallet as it is being fed into the saw blade 40, the cantilevered supports 30 should extend upstream of the saw blade 40 at least half the length of the stringer boards 56, or at least two feet, so the pallets do not tilt off of the horizontal plane defined by the cantilevered supports 30 as they are fed into the cutting blade 40.

Also, in this embodiment, the unsupported distance over which the cantilevered supports 30 project from the cross-beam 25 upstream to the band saw blade 40 is 52 inches, which again is slightly greater than the length of the stringer boards 56. The supports 30 should be cantilevered from the cross-beam 25 to the saw blade 40 at least the length of the pallet (the length of the stringer boards 56) in order to prevent interference between the remainder of the pallet and the support structure as the partially dismantled pallet progresses downstream past the cutting blade 40.

Since the cantilevered supports 30 generally will be cantilevered from the support structure to the saw blade 40 a distance slightly greater than the length of the pallet, and since they should continue to be cantilevered a distance upstream of the saw blade 40 at least half the length of the pallet in order to provide good support for the pallet as it is being fed into the saw blade 40, the cantilevered supports 30 typically will extend upstream of the saw blade 40 at least half of the distance that they are cantilevered (unsupported) downstream of the saw blade 40, and, for better support, they usually will extend upstream from the saw blade 40 about the same distance that they are cantilevered downstream of the saw blade 40. In other embodiments, there could be more or fewer cantilevered supports.

Figure 5B:
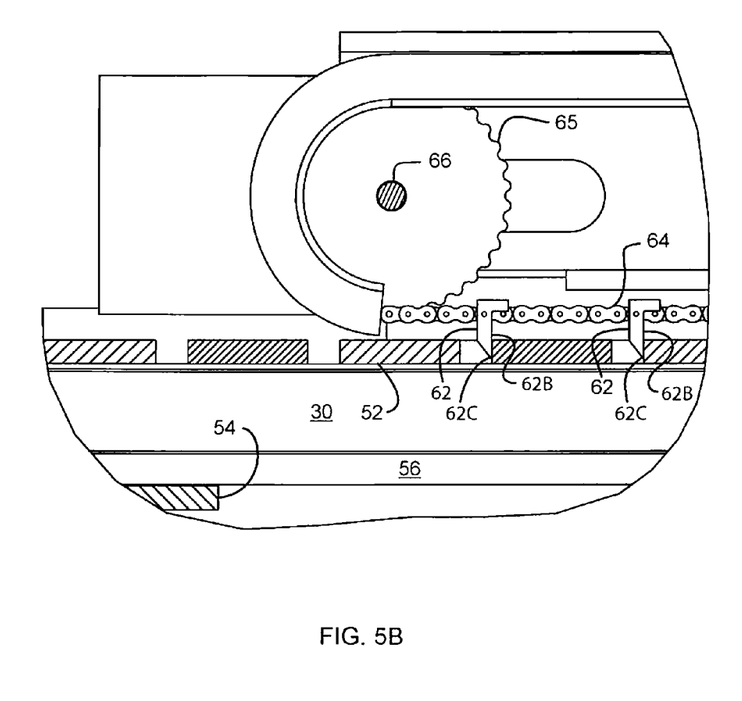
FIG. 5B is an enlarged view of the portion 5B of FIG. 5A.

While the pallets 50 could be fed through the saw by hand, this pallet dismantler 10 also includes a feed conveyor 60 extending parallel to and above the cantilevered supports 30 for feeding the pallet 50 through the saw. As best shown in FIGS. 5A and 5B, the feed conveyor 60 includes propelling elements 62 that engage a pallet 50 resting on the cantilevered supports 30 and propel it downstream through the pallet dismantler 10. In this embodiment, the feed conveyor 60 includes three separate and parallel chains 64 driven by sprockets 65 sharing the same front and rear axles 66, 68. Each chain 64 has a plurality of evenly spaced and aligned projections 62, which function as propelling elements, contacting the deck boards of the pallet and dragging it downstream along the cantilevered supports 30. Each projection 62 has a flat forward surface 62B for contacting the rear edge of the deck boards and a pointed end 62C for contacting the top surface of the deck boards. The projections 62 are short enough that they will not interfere with the saw blade.

Underneath the cantilevered supports 30 are two return conveyors 70, which, in this embodiment, are belt conveyors. While the remainder of the pallets 50 could be returned manually, the return conveyors 70 collect the remainder of the pallet 50 that falls during the dismantling process and return the remainder to the upstream end 22 of the pallet dismantler 10. The two return conveyors 70 operate parallel to each other and at the same speed. Of course, the pair of return conveyors could be replaced by a single return conveyor.

Figure 6:
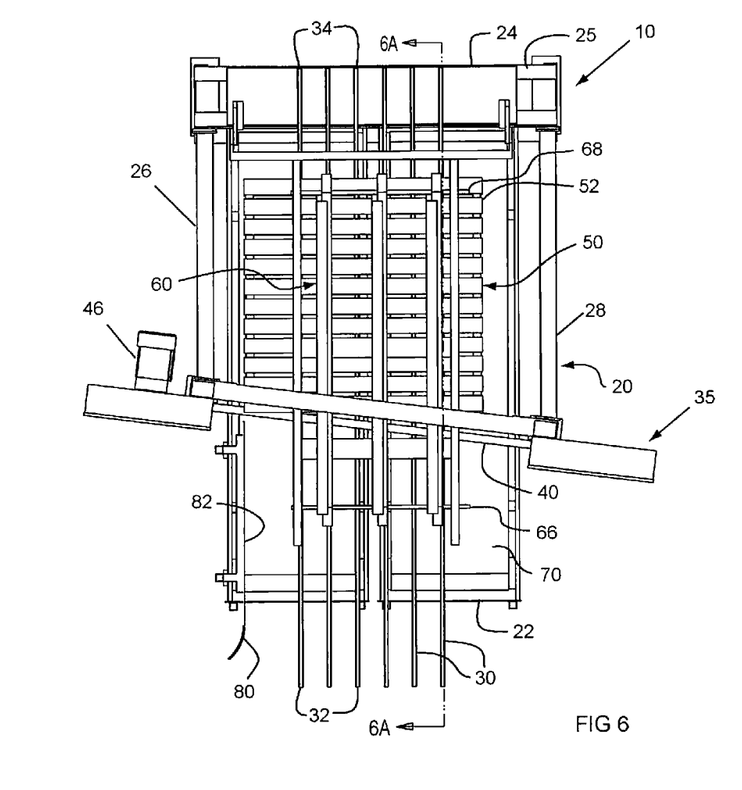
FIG. 6 is a top view of the pallet dismantler of FIG. 1, shown in a second stage of dismantling a pallet.
Figure 7:
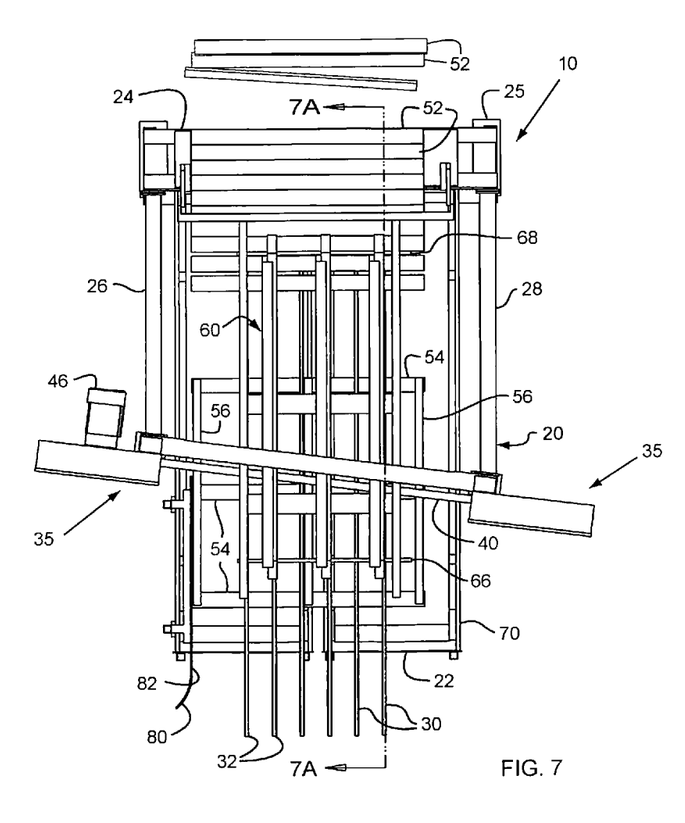
FIG. 7 is a top view of the pallet dismantler of FIG. 1, shown in a third stage of dismantling a pallet.

The pallet dismantler 10 also includes a guide rail 80 positioned on the left side 26 of the frame 20 parallel to the cantilevered supports 30. The guide rail 80 defines a vertical abutment surface 82 for receiving and guiding the left side of a pallet 50 as it is fed past the band saw blade 40. Since the band saw blade 40 moves through the cutting plane in a right to left direction, it has a natural tendency to thrust the object it is cutting to the left. Thus, the guide rail 80 is positioned on the left side 26 of the frame 20 to provide a stop for the pallet 50 as it is cut by the band saw blade 40. In addition, the band saw blade 40 in this embodiment is angled slightly off of perpendicular to the cantilevered supports 30 and to the direction of travel of the pallet 50, which is in the direction of the cantilevered supports 30. As best shown in FIGS. 5, 6 and 7, the portion of the band saw blade 40 near the left side 26 of the frame 20 is slightly downstream from its position near the right side 28 of the frame 20. By angling the band saw blade 40 relative to the direction of travel of the pallet 50, the right side of the pallet 50 is cut by the band saw blade 40 slightly ahead of the left side of the pallet 50. This facilitates feeding the pallet 50 into the saw blade 40, so that only a portion of the pallet 50 contacts the saw blade 40 at first, and then the rest of the front edge of the pallet 50 is gradually fed into the saw blade 40.

FIGS. 2, 2A, 3 and 4 are views of the pallet dismantler 10 with a pallet 50 loaded onto the cantilevered supports 30 and ready for dismantling. The pallet 50 is a standard stringer-style pallet 50 having a set of upper deck boards 52, a set of lower deck boards 54, and a set of stringer boards 56 secured perpendicularly between the upper and lower sets of deck boards 52, 54. The upper and lower sets of deck boards 52, 54 typically are secured to the stringer boards with nails, staples, or similar fasteners. In this case, there are twelve upper deck boards 52, three lower deck boards 54, and three stringer boards. Of course, the number of boards may vary. As was explained earlier, a typical pallet 50 has stringer boards 56 that are four feet long and deck boards 52 that are 40 inches long. The pallet 50 has been loaded manually onto the cantilevered supports 30, being slid onto the free, upstream end 32 of the supports, such that it hangs from the horizontal cantilevered supports 30 with the set of upper deck boards 52 resting on the top surface of the cantilevered supports 30 and the rest of the pallet 50 extending downwardly. The pallet 50 travels along a direction of travel from the free, upstream end of the cantilevered supports 30 to the downstream end.

Figure 3:
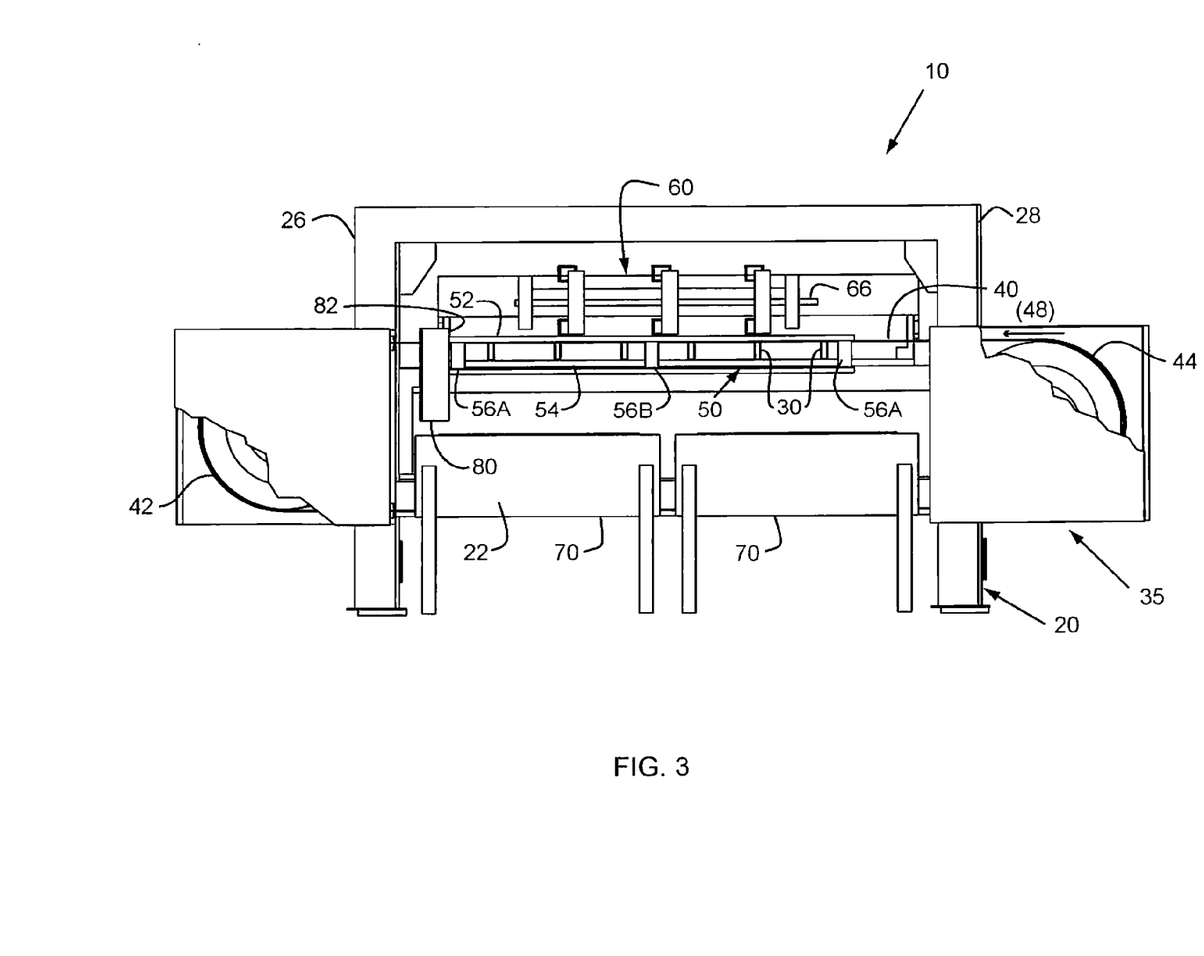
FIG. 3 is an upstream view of the pallet dismantler of FIG. 1, shown with a pallet loaded.
Figure 4:
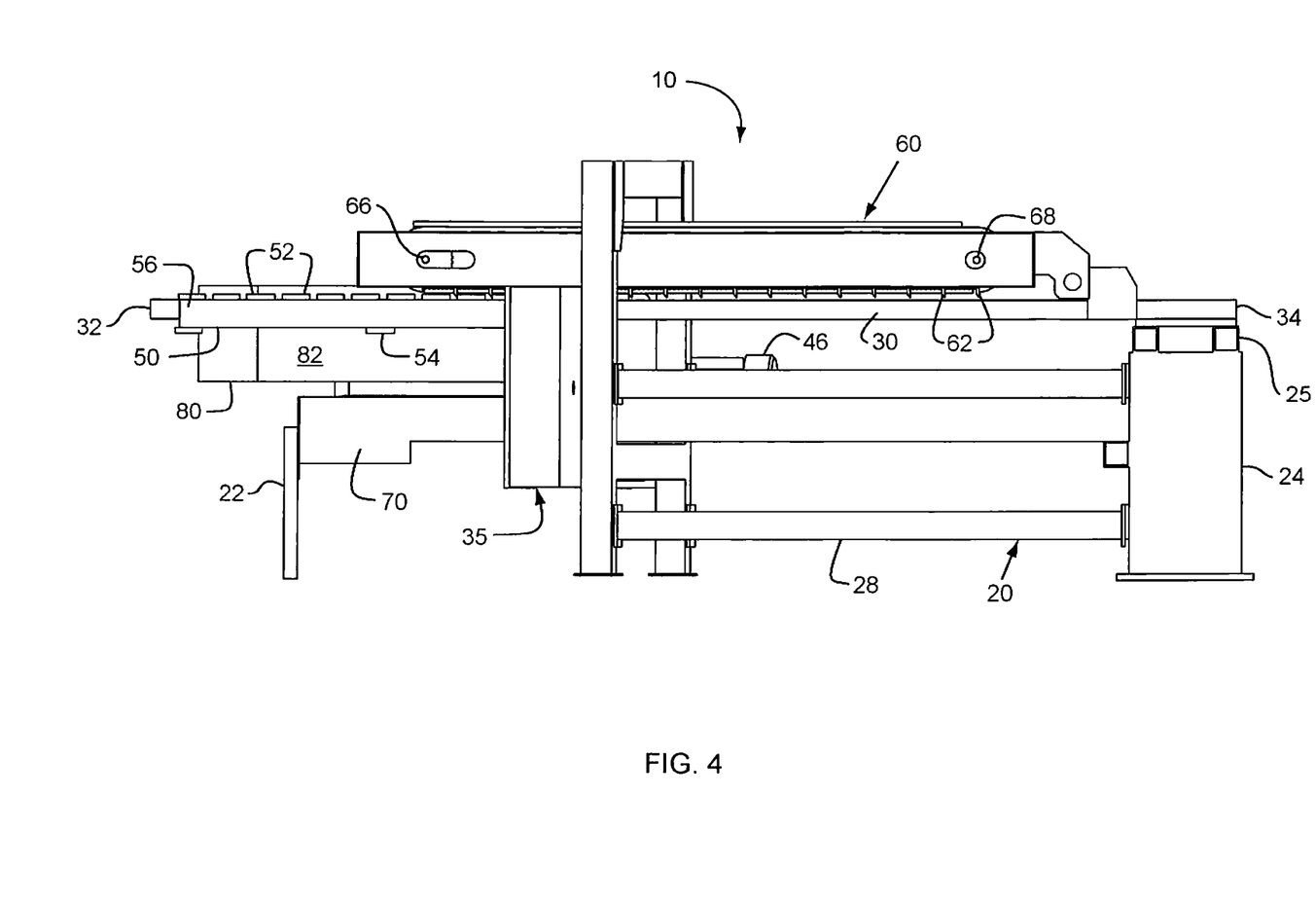
FIG. 4 is a right side view of the pallet dismantler of FIG. 1, shown with a pallet loaded.

As best shown in FIG. 3, when the pallet 50 is hung from the cantilevered supports 30, the stringer boards 56A, 56B extend downwardly from the upper deck boards 52 past the cantilevered supports 30, with the two outer stringer boards 56A positioned on the outside of the cantilevered supports 30 and the middle stringer board 56B positioned between a pair of adjacent, internal cantilevered supports 30. The set of lower deck boards 54, which is secured to the bottom of the stringer boards 56, is positioned beneath the cantilevered supports 30. Thus, the height of the cantilevered supports 30 is less than the height of the stringer boards 56, so the cantilevered supports 30 fit between the upper and lower sets of deck boards 52, 54 of a standard pallet. Further, the cantilevered supports 30 are relatively narrow, leaving sizable spaces between the supports 30 so that pallets with various configurations of stringer boards can fit between the cantilevered supports 30. In this particular embodiment, the cantilevered supports 30 are 2.5 inches high, 1.25 inches wide, and are spaced apart on 6 inch centers.

Figure 2A:
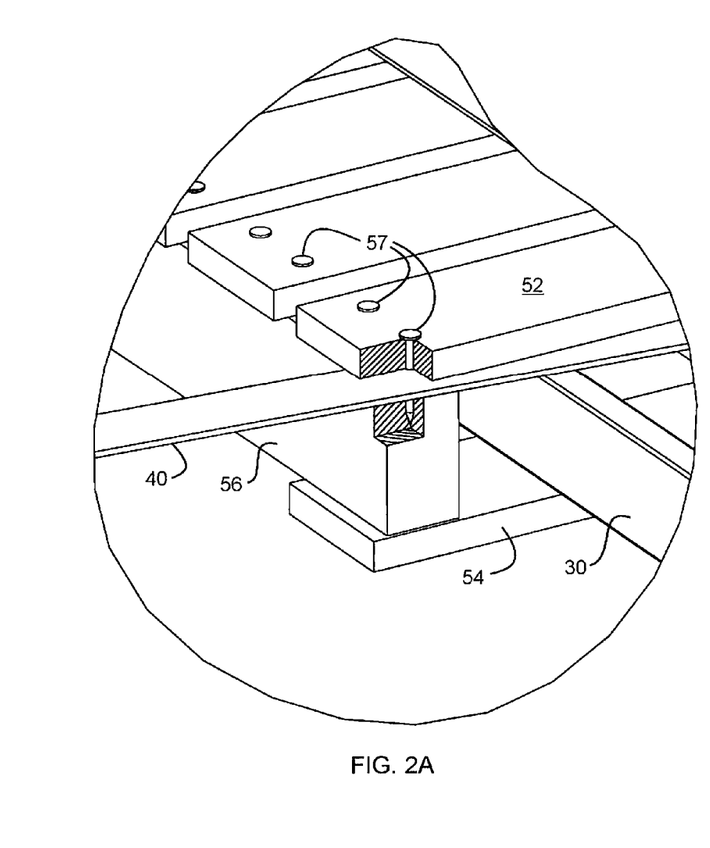
FIG. 2A is an enlarged view of the portion 2A of FIG. 2.

Since the band saw blade 40 is substantially aligned with the top surfaces of the cantilevered supports 30, and the upper deck boards 52 rest on the top surface of the cantilevered supports 30, the band saw blade 40 is automatically aligned with the joint between the upper deck boards 52 and the stringer boards 56 when the pallet 50 is hung from the cantilevered supports 30. As the pallet 50 is advanced toward the band saw blade 40, the band saw blade 40 cuts the pallet 50 at the joint between the upper deck boards 52 and the stringer boards 56, cutting through the nails or staples 57, without damaging the boards, as best shown in FIG. 2A. Thus, the pallet dismantler 10 is designed to cut through the fasteners that secure the upper deck boards 52 to the stringer boards 56, separating the upper deck boards 52 from the stringer boards 56, while leaving the boards 52, 56 intact. Of course, due to inconsistencies in individual pallets, such as the inconsistencies that may result from warped boards, the band saw blade 40 may cut slightly into the boards in some cases. However, in most instances, the upper deck boards 52 and stringer boards 56 remain essentially intact.

FIGS. 5, 5A, 5B, 6, 6A, 7, and 7A show the pallet 50 at various stages in the dismantling process. In FIGS. 5 and 5A, the band saw blade 40 has just started cutting through the pallet 50. The pallet 50 has been advanced a short distance by the feed conveyor 60 via the propelling elements 62 contacting the upper deck boards 52 as the chains 64 of the feed conveyor 60 are driven by the sprockets 65, conveying the pallet 50 from the upstream end 22 of the frame toward the downstream end 24.

Figure 6A:
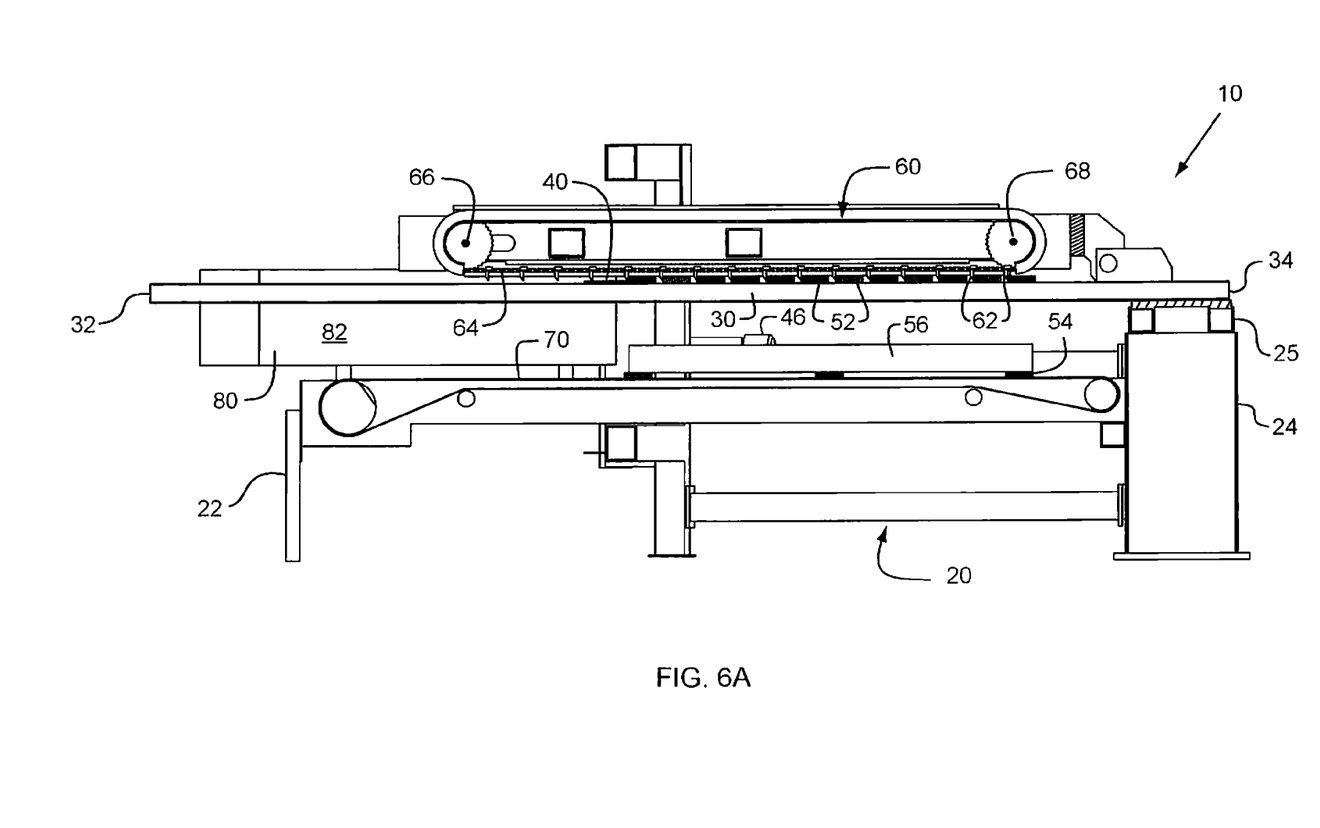
FIG. 6A is a side sectional view taken along line 6A-6A of FIG. 6.

FIGS. 6 and 6A show an intermediate stage in the dismantling process. At this stage, the band saw blade 40 has separated all of the upper deck boards 52 from the stringer boards 56. The pallet remainder, which is a combination of stringer boards 56 and lower deck boards 54 (which are still fastened together), has fallen onto the return conveyors 70, and the upper deck boards 52 continue to be advanced toward the downstream end 24 of the frame 20 by the feed conveyor 60, where they fall off the end and are collected in a downstream hopper 74 (shown in FIG. 7A).

It should be noted that, while the return conveyors 70 have been shown here as being a substantial distance below the cantilevered supports 30 and being oriented horizontally, the height of the return conveyors 70 is adjustable. In practice, the return conveyors 70 typically would be adjusted so they would be higher at the point where they catch the pallet remainders and would be lower at the upstream end of the conveyor. It is preferable that the point where the return conveyor 70 catches the pallet remainder be just slightly lower than the bottom of the stringers 56 and lower deck boards 54 it is catching in order to prevent the falling stringers 56 and lower deck boards 54 from shifting downwardly a great enough distance to cause the rear of the pallet to tip upwardly, out of proper alignment with the saw blade. Alternatively, instead of a return conveyor 70, an angled catch pan may be used. In that case, the portion of the catch pan that catches the pallet remainder would be at a high enough elevation to prevent the falling stringers 56 from falling far enough to cause the rear of the pallet to tip upwardly out of alignment with the blade, and the catch pan would be angled downwardly in the upstream direction so the pallet remainder slides down the catch pan to the upstream end of the saw.

Figure 7A:
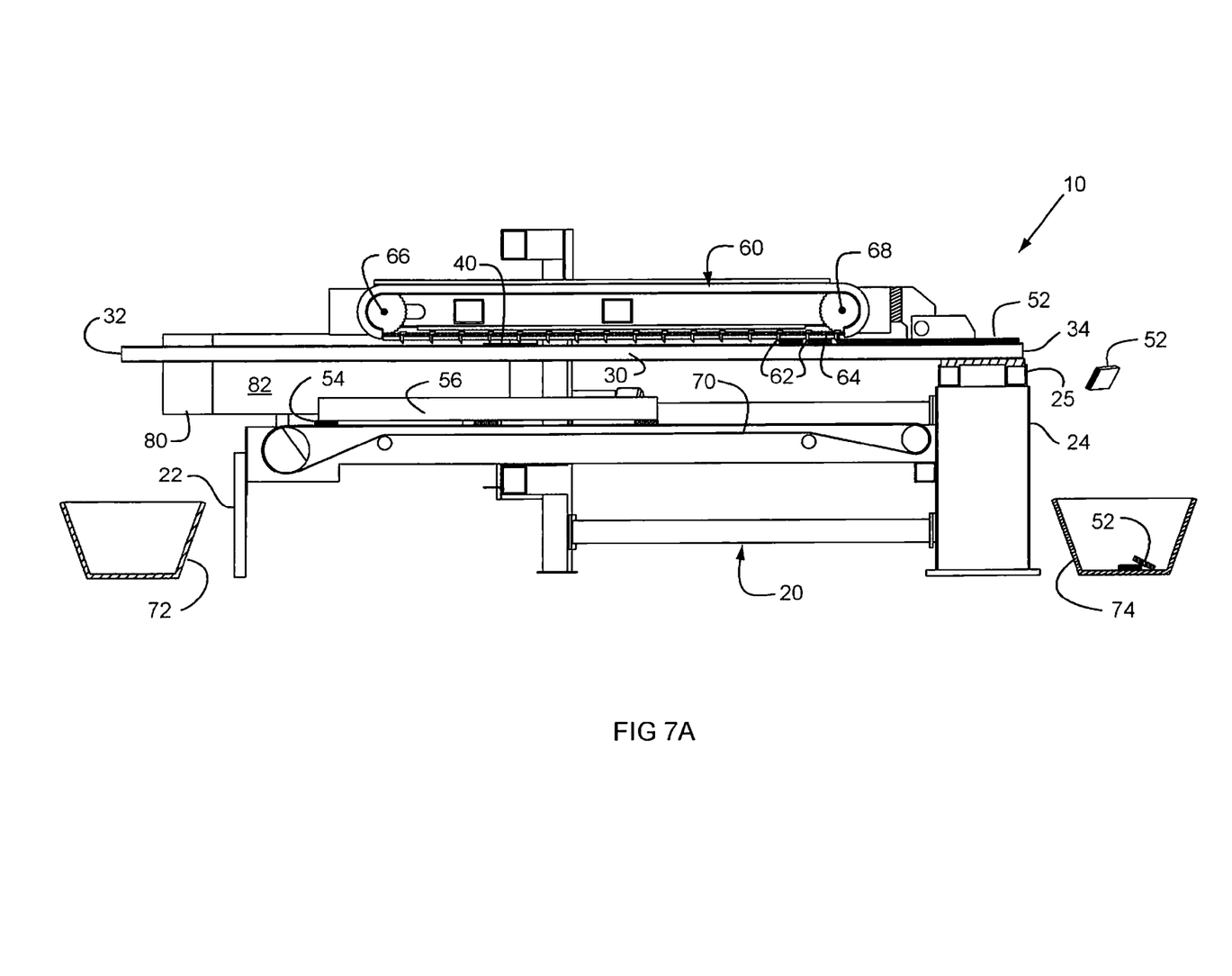
FIG. 7A is a side sectional view taken along line 7A-7A of FIG. 7.

FIGS. 7 and 7A show a subsequent stage of the dismantling process. At this point, the upper deck boards 52 have reached the downstream end 24 of the frame, with several of the upper deck boards 52 falling into the downstream hopper 74. As the dismantling process continues, the upper deck boards 52 accumulate in the downstream hopper 74. Also at this point, the remaining combination of lower deck boards 54 and stringer boards 56 (still secured together) has advanced close to the upstream end 22 of the saw via the return conveyors 70.

In the next stage of dismantling, an operator standing at the upstream end 22 of the saw 10 typically removes the remaining combination of lower deck boards 54 and stringer boards 56 from the return conveyor 70 and feeds it back into the pallet dismantler 10, this time with the set of lower deck boards 54 resting on the cantilevered supports 30 and the stringer boards 56 extending downwardly past the cantilevered supports 30. As this pallet remainder is fed past the band saw blade 40, the stringer boards 56 are separated from the lower deck boards 54, with the set of lower deck boards 54 falling into the downstream hopper 74 and the stringer boards 56 falling onto the return conveyor 70 and returning to the upstream end 22, where they fall into an upstream hopper 72 (shown in FIG. 7A). The result is that the upper and lower deck boards 52, 54 are collected in the downstream hopper 74, and the stringer boards 56 are collected in the upstream hopper 72.

It will be obvious to those skilled in the art that modifications may be made to the embodiment described above without departing from the scope of the invention as claimed.

What is claimed is:

1. A pallet dismantler, comprising:
   a frame including at least one cantilevered support which is supported by a frame member at a downstream end and is cantilevered upstream from said frame member to an upstream free end, said cantilevered support having a top surface which is substantially horizontal, and having a bottom surface opposite said top surface, wherein said top surface is at a higher elevation than said bottom surface;
   a band saw blade lying directly on top of the top surface of the cantilevered support and defining a cutting plane extending parallel to and substantially coplanar with said top surface of said cantilevered support;
   wherein said upstream free end lies upstream from said band saw blade so said cantilevered support can support a pallet to be fed into the band saw blade.

2. A pallet dismantler as recited in claim 1, wherein the distance from said band saw blade to said upstream free end is at least half of the distance from said frame member to said band saw blade.

3. A pallet dismantler as recited in claim 2, wherein said band saw blade moves across said cantilevered support from a first side to a second side, and further comprising at least one rail on the second side of said frame to provide a stop for the pallet.

4. A pallet dismantler as recited in claim 3, wherein said cantilevered support defines a direction of travel from said upstream free end to said downstream end and said band saw blade is angled slightly off of being perpendicular to said direction of travel.

5. A pallet dismantler as recited in claim 1, and further comprising a first conveyor extending parallel to and above said cantilevered support, said first conveyor conveying in a downstream direction to convey pallets downstream past the band saw blade.

6. A pallet dismantler as recited in claim 4, and further comprising a return conveyor extending parallel to and below said cantilevered support, said return conveyor conveying in an upstream direction.

7. A pallet dismantler as recited in claim 5, and further comprising a return conveyor extending parallel to and below said cantilevered support, said return conveyor conveying in an upstream direction.

8. A pallet dismantler as recited in claim 1, and further comprising a pallet, including a set of upper deck boards having top and bottom surfaces; a set of lower deck boards having top and bottom surfaces; and a set of stringer boards sandwiched between the bottom surfaces of the upper deck boards and the top surfaces of the lower deck boards and defining a joint between the upper deck boards and the stringer boards, wherein, when said pallet hangs from said cantilevered support, with the bottom surfaces of the upper deck boards resting on top of the top surface of the cantilevered support, said cutting plane is automatically aligned with said joint between the upper deck boards and the stringer boards, since both the band saw blade and the bottom surfaces of the upper deck boards are resting on top of the top surface of the cantilevered support.

* * * * *